Patented Nov. 28, 1950

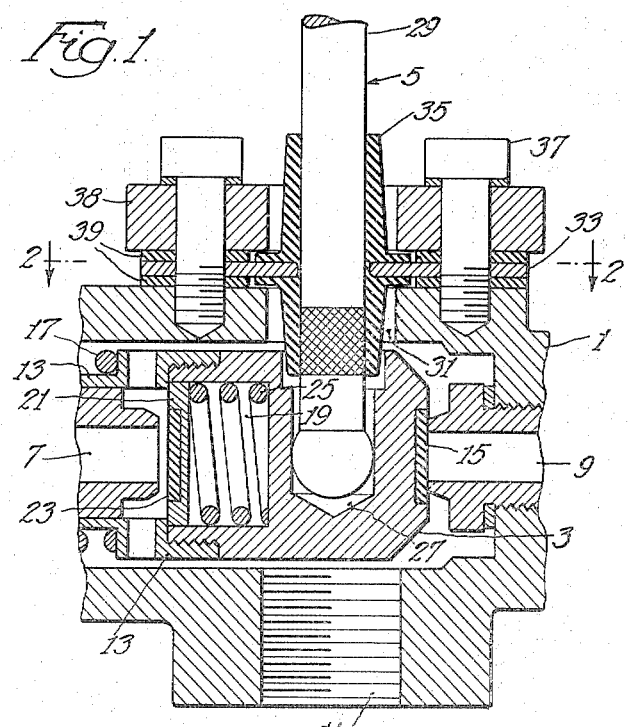
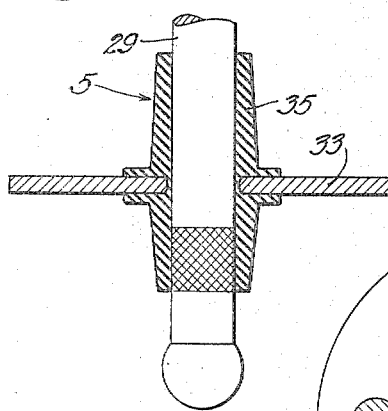
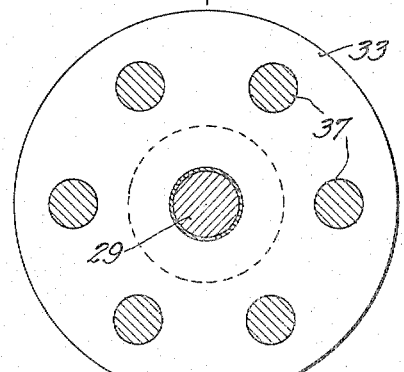

2,532,210

UNITED STATES PATENT OFFICE 2,532,210

PACKING GLAND

Henry G. Wasserlein, Park Ridge, Ill., assignor to Phillips Control Corporation, Chicago, Ill., a corporation of Illinois Application April 12, 1946, Serial No. 661,813

1 Claim. (Cl. 286—29)

This invention relates to a novel type of packing gland, and is particularly related to a novel valve structure or other fluidtight chamber wherein it is desired to effect transfer movement through a wall in which the packing gland herein contemplated is especially valuable.

In accordance with the present invention, a novel gland has been provided which is very simple in construction, involves fewer parts and is less costly to make than the conventional types of packing glands. This gland comprises a disc with an aperture therein, and a lever extending through the aperture which is integrally bonded to and sealed to the disc by means of a resilient bonding material such as rubber. The size of the aperture and the lever are correlated so that a relatively close fit is established whereby upon lateral movement of the lever the edges of the disc serve as a fulcrum therefor. The invention will be more fully understood by reference to the accompanying drawings in which:

Figure 1 is a diagrammatic vertical sectional view of a three way valve in which the packing gland herein contemplated is utilized, Figure 2 is a horizontal sectional view along the line 2—2 of Figure 1, and Figure 3 is a vertical sectional view of the gland taken along the line 3—3 of Figure 2.

As illustrated in the drawings the valve comprises a conventional valve shell or casing 1, provided with a valve poppet 3, and a valve stem assembly 5. The valve itself is diagrammatically illustrated as a three way valve having passages 7, 9 and 11 which function as inlets or outlets depending upon the application and the position of the poppet. Two of these passages terminate in tubular projections which extend inwardly toward the poppet as indicated in the drawings, and function as valve seats.

The valve poppet is threadedly mounted on a sleeve 13 which is slidable upon the plug 7, and as shown in the drawings, is held in a position closing passage 9 since the soft seat 15 of suitable material such as rubber is mounted in the valve poppet, and engages the valve seat at passage 9 to form a tight seal. The valve poppet is held in this position by means of a suitable return spring diagrammatically illustrated at 17, the end of which abuts the circumferential projection of the sleeve 13. Inasmuch as the exact structure of the poppet and sleeve mechanism forms no part of the present invention, it is merely diagrammatically illustrated in fragmentary form.

The poppet is also provided with a socket 19 in which is seated a disc 21 provided with a soft seat of resilient material such as rubber 23. This disc is held in place by a suitable spring 25 and sleeve 13. The poppet is also provided with a second socket 27 into which extends a lever 29 for adjusting the position of the valve poppet.

The valve stem assembly exxtends downward through the opening 31 in the upper portion of the valve casing, and comprises a lever or valve stem 29 which extends through an aperture in a flat disc 33 of metal or other rigid material, having thickness sufficient to have substantial rigidity for example 0.05–0.1 inch and is resiliently bonded to the ring by means of a tubular rubber sleeve or sheath 35. This rubber sleeve is intimately bonded to both the metal surfaces of the lever and of the flat ring. It will be noted that the size of the aperture in the disc is only slightly larger than the size of the lever, so that a small clearance, for example of the order of one or two thousandths of an inch is provided. By this means the edges of the disc aperture serve as a fulcrum when the lever is moved and force is transmitted to the valve poppet. Furthermore it will be noted that the inner diameter of the disc is rounded or at least tapered so as to provide an especially convenient bearing surface or fulcrum which the lever bears upon when the ends thereof are moved.

The rubber is molded on to the valve stem assembly to provide a substantially integral assembly and extends along the lever, for example of the order of one-half to one and one-half inches, forming essentially a sleeve therefor. The rubber also extends outwardly a substantial distance along the flat disc providing a resilient flange on either side of the disc. The disc 33 is of substantial diameter and is sealed around the opening 31 by sealing gaskets 39 and a plurality of bolts 37 bolted to the valve through a ring 38.

Lever 29 terminates in its lower end in the form of a ball which engages the surface of the socket 27, so that upon lateral movement of the upper end of the lever, the ball forms a rolling contact with the sides of the socket, and causes lateral movement of the valve poppet.

In operation the valve may be set as indicated in the drawings so that valve seat 9 is closed. This adjustment may be changed by simply moving the upper end of lever 29 toward the right whereby sufficient force is imparted to cause movement of the valve poppet away from valve seat 9, and against valve seat 7. In such a case the valve seat 7 resiliently engages the soft seat 23, thereby forming a seal and closing off the flow of fluids through passage 7, and permitting such flow through the other passage in the conventional manner. During this movement, the disc holds the lever firmly in place and the edges adjacent the lever act as a fulcrum whereby a mechanical advantage, proportional to the respective distances of the ends of the lever from the disc is gained as will be understood by those skilled in the art.

It will be understood that the assemblage herein described may be constructed of any convenient structural material having the necessary rigidity such as metal, and that the resilient and elastic bonding sleeve 35 may be of any convenient material capable of establishing an intimate resilient bond and seal, and which also is capable of being flexed a large number of times. Vulcanized soft rubber or synthetic rubber such as the co-polymers of butadiene and styrene or butadiene-acrylonitrile co-polymers or the polymers of chloroprene may be used for this purpose, and the term rubber as herein used is intended to include both natural and synthetic rubber compositions.

The packing gland herein described is very simple in construction, and is cheap to make. Moreover, it will remain leakproof indefinitely, and requires little or no maintenance. In addition, this type of packing gland is especially valuable since the power required in effecting transfer movement through the gland is substantially a fixed value, and does not vary to any appreciable degree in use. As a consequence an electric or other form of actuator may be provided to actuate the lever using an actuator having a predetermined power. When in service, development of additional frictional loss to the point of stalling the actuator rarely ever occurs. Furthermore, the gland herein contemplated offers the advantage of permitting transfer movement by means of a solenoid or other suitable actuator which is mounted outside of the valve chamber or pressure chamber into which transfer movement is desired to be effected. This materially simplifies the construction of the solenoid.

Although the present invention has been described with particular reference to certain details of specific embodiments thereof, it is not intended that such details shall be regarded as limitations upon the scope of the invention except insofar as included in the accompanying claim.

Having thus described my invention, I claim:

A packing gland for use in transmitting movement through the wall of a fluid tight wall such as a valve casing which comprises a disc having substantial rigidity, an aperture in the disc, the edges of the aperture having rounded edges, a lever extending through the aperture and resiliently bonded and sealed to the disc by a rubber sleeve filling the space in the aperture around the lever and overlapping and adhering to the adjacent surfaces of the disc and the lever on both sides of the aperture, the relative sizes of the lever and the aperture being such that the edges of the aperture serve as a fulcrum upon lateral movement of the ends of the lever and the bond having such resilience that such movement of the lever does not break the seal.

HENRY G. WASSERLEIN.

REFERENCES CITED

The following references are of record in the file of this patent:

UNITED STATES PATENTS

| Number | Name | Date |
| --- | --- | --- |
| 590,240 | Savill | Sept. 21, 1897 |
| 2,114,900 | Gilchrist | Apr. 19, 1938 |
| 2,240,332 | Heinze et al. | Apr. 29, 1941 |
| 2,245,400 | Hill | June 10, 1941 |
| 2,309,446 | Ekkebus | Jan. 26, 1943 |
| 2,388,327 | Jacobsson | Nov. 6, 1945 |
| 2,417,546 | DeGiers | Mar. 18, 1947 |

FOREIGN PATENTS

| Number | Country | Date |
| --- | --- | --- |
| 411,276 | Great Britain | June 7, 1934 |